United States Patent
Isaac (10) Patent No.: US 11,613,271 B2
(45) Date of Patent: Mar. 28, 2023

(54) DRIVER BEHAVIOR TRACKING AND PREDICTION

(71) Applicant: Allstate Insurance Company, Northbrook, IL (US)

(72) Inventor: Emad Isaac, Downers Grove, IL (US)

(73) Assignee: Allstate Insurance Company, Northbrook, IL (US)

(*) Notice: Subject to any disclaimer, the term of this patent is extended or adjusted under 35 U.S.C. 154(b) by 291 days.

(21) Appl. No.: 16/996,484

(22) Filed: Aug. 18, 2020

(65) Prior Publication Data
US 2022/0055649 A1 Feb. 24, 2022

(51) Int. Cl.
| | |
|---|---|
| G06N 20/00 | (2019.01) |
| B60W 50/14 | (2020.01) |
| B60W 40/09 | (2012.01) |
| G06F 16/9535 | (2019.01) |
| G06Q 30/06 | (2012.01) |
| B60W 60/00 | (2020.01) |
| G06N 5/04 | (2023.01) |

(Continued)

(52) U.S. Cl.
CPC .......... B60W 60/001 (2020.02); B60W 40/09 (2013.01); B60W 50/14 (2013.01);
(Continued)

(58) Field of Classification Search
CPC .... B60W 60/001; B60W 40/09; B60W 50/14; B60W 60/0059; B60W 2540/049; B60W 2540/30; B60W 2556/45; G06F 16/9535; G06N 5/04; G06N 20/00; G07C 5/0816; G08G 1/22; G08G 1/0112; G08G 1/0129;
(Continued)

(56) References Cited

U.S. PATENT DOCUMENTS 8,140,359 B2 3/2012 Daniel
8,510,200 B2 8/2013 Pearlman et al.
(Continued)

FOREIGN PATENT DOCUMENTS

EP 2293255 B1 6/2016
KR 20190034965 A 4/2019

OTHER PUBLICATIONS

Jachimczyk, et al., "IoT On-Board System For Driving Style Assessment," Sensors 2018, 18, 1233, 22 pages, published Apr. 17, 2018.
(Continued)

*Primary Examiner* — Peter D Nolan
*Assistant Examiner* — Ashley L Redhead, Jr.
(74) *Attorney, Agent, or Firm* — Polsinelli PC (57) ABSTRACT

Methods and systems for tracking driver behavior across a variety of vehicles are described herein. One or more first performance metrics which indicate performance of a first vehicle when driven by a user may be determined. One or more second performance metrics indicating performance of a second vehicle when driven by the user may be determined. The first vehicle and the second vehicle may be compared to determine a vehicle difference. The performance metrics may be compared. One or more third performance metrics that predict performance of a third vehicle, different from the first vehicle and the second vehicle, when driven by the user may be determined based on the vehicle difference and the comparison. Whether to provide the user access to the third vehicle may be determined based on the one or more third performance metrics.

20 Claims, 6 Drawing Sheets

(51) Int. Cl.
*G07C 5/08* (2006.01)
*G09B 19/16* (2006.01)
*G08G 1/00* (2006.01)
*G06Q 30/0645* (2023.01)
*G06Q 50/30* (2012.01)
*G05D 1/00* (2006.01)

(52) U.S. Cl.
CPC ..... *B60W 60/0059* (2020.02); *G06F 16/9535* (2019.01); *G06N 5/04* (2013.01); *G06N 20/00* (2019.01); *G07C 5/0816* (2013.01); *G08G 1/22* (2013.01); *G09B 19/167* (2013.01); *B60W 2540/049* (2020.02); *B60W 2540/30* (2013.01); *G05D 1/0088* (2013.01); *G05D 2201/0213* (2013.01); *G06Q 30/0645* (2013.01); *G06Q 50/30* (2013.01); *G06Q 2240/00* (2013.01)

(58) Field of Classification Search
CPC ............ G09B 19/167; G05D 1/0088; G05D 2201/0213; G06Q 30/0645; G06Q 50/30; G06Q 2240/00
See application file for complete search history.

(56) References Cited

U.S. PATENT DOCUMENTS

| | | | |
|---|---|---|---|
| 9,412,282 | B2 | 8/2016 | Hunt et al. |
| 9,535,878 | B1 | 1/2017 | Brinkmann et al. |
| 10,127,570 | B1 | 11/2018 | Cote et al. |
| 10,196,071 | B1 * | 2/2019 | Rowson ................. G07C 5/008 |
| 10,242,513 | B1 | 3/2019 | Fields et al. |
| 10,259,466 | B2 | 4/2019 | Memani et al. |
| 10,296,977 | B2 | 5/2019 | Chevrette |
| 10,339,732 | B2 | 7/2019 | Plante et al. |
| 10,351,145 | B2 | 7/2019 | Izraeli et al. |
| 10,402,771 | B1 | 9/2019 | De et al. |
| 10,832,261 | B1 * | 11/2020 | Chan .................... G06Q 40/025 |
| 2007/0027726 | A1 | 2/2007 | Warren et al. |
| 2010/0030586 | A1 | 2/2010 | Taylor et al. |
| 2011/0288891 | A1 | 11/2011 | Zaid et al. |
| 2012/0066007 | A1 | 3/2012 | Ferrick et al. |
| 2014/0108198 | A1 | 4/2014 | Jariyasunant et al. |
| 2014/0278574 | A1 | 9/2014 | Barber |
| 2015/0371153 | A1 | 12/2015 | Lohmeier et al. |
| 2017/0032673 | A1 * | 2/2017 | Scofield ................. G06Q 40/08 |
| 2018/0201225 | A1 * | 7/2018 | Farges ................... H04W 12/08 |
| 2021/0107494 | A1 * | 4/2021 | Silver ................... B60W 50/14 |

OTHER PUBLICATIONS

Shilpa, "Self-drive car rentals like ZoomCar, Revv are experimenting and innovating on tech front," The Economic Times, updated Sep. 25, 2015, 1 page.

How data can improve profits and C-Sat for the car rental business, BRIDGEi2i: AI for the Digital Enterprise, <https://bridgei2i.com/how-data-can-improve-profits-and-c-sat-for-the-car-rental-business/>, printed May 6, 2020, 5 pages.

* cited by examiner

DRIVER BEHAVIOR TRACKING AND PREDICTION

FIELD

Aspects described herein generally relate to telematics devices and telemetry, automobile safety, automobile tracking, peer-to-peer automobile rental services, and hardware and software related thereto. More specifically, one or more aspects described herein provide for tracking driver performance across, and predicting driver behavior in, different automobiles.

BACKGROUND

Car rental services allow drivers to rent a wide variety of vehicles in a wide variety of locations. For example, a driver might rent a sedan when visiting a new city, and/or might rent a fun sports car when visiting the beach on vacation. To protect such vehicles, car rental services typically require that a renter have insurance, and/or such car rental services may maintain insurance on rented vehicles. Car rental services may also impose other requirements on rentals, such as requiring that the driver have a legal driver's license.

Increasingly, peer-to-peer vehicle sharing services are becoming popular. Such services allow automobile owners to list their vehicle for rent (e.g., on a smartphone app), allowing those owners to monetize their vehicle when they might not need it. A user may, for example, open an application on their phone, browse a listing of available vehicles (e.g., those parked at an airport, those available if the user travels to the home of the owner, or the like) and pay a time-based fee for access to a selected vehicle. That said, the ad hoc nature of such rentals often limits the legal protections that automobile owners might leverage to protect their automobile. For example, unless provided in the peer-to-peer vehicle sharing app, some automobile owners may not have the resources to verify the validity and/or comprehensiveness of an insurance policy maintained by a renter.

The diversity and ready accessibility of such rental and peer-to-peer vehicle sharing services has allowed users to rent vehicles (e.g., exotic sports cars, manual transmission vehicles, large trucks, motorcycles) which renters might not necessarily have driven before. As such, automobile owners (whether companies or individuals) are often concerned that an inexperienced renter could damage their vehicle. For example, vintage automobile owners who list their cars on peer-to-peer vehicle sharing services are often concerned that inexperienced renters might crash their vehicles or damage the engine by revving the engine too hard. Though a potential renter of a vehicle may already have insurance and may already be associated with a driving score or traffic violation history, such information may be a poor indicator of how well the renter would drive a new type of vehicle, and validating the accuracy of such information may be prohibitively difficult for certain automobile owners. After all, the renter may be capable of driving their personal vehicle well, but may have difficulties driving a new and unfamiliar type of vehicle (e.g., a high horsepower sports car) in a similarly safe manner.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards tracking and predicting driver behavior across different vehicles.

A computing device may, using first sensors of a first vehicle, determine one or more first performance metrics indicating performance of a first vehicle when driven by a user. The computing device may determine, using second sensors of a second vehicle, one or more second performance metrics indicating performance of a second vehicle when driven by the user. The first sensors and/or the second sensors may comprise, for example, one or more first sensors of a smartphone. The first vehicle and second vehicle may be compared to determine a vehicle difference between the first vehicle and the second vehicle. Determining the vehicle difference may comprise determining that the first vehicle and the second vehicle are each configured to provide different levels of autonomous driving. The one or more first performance metrics and the one or more second performance metrics may be compared to determine a behavioral difference of the user when driving the first vehicle as compared to the second vehicle. Determining the behavioral difference may comprise determining that the user drove the first vehicle with a different quantity of passengers as compared to the second vehicle. Determining the behavioral difference may comprise determining that the user is more reckless when driving the first vehicle as compared to the second vehicle. Determining the behavioral difference may comprise determining that the user is more distracted when driving the first vehicle as compared to the second vehicle. Determining the behavioral difference may comprise determining how the user is predicted to drive a rental vehicle as compared to a personal vehicle, wherein the first vehicle is owned by the user, and wherein the second vehicle is rented by the user. Based on the behavioral difference and the vehicle difference, the computing device may determine one or more third performance metrics which predict performance of a third vehicle, different from the first vehicle and the second vehicle, when driven by the user. Determining the one or more third performance metrics may comprise determining at least one of the one or more third vehicles that is similar to the first vehicle; and predicting, based on the one or more first performance metrics, the one or more third performance metrics by estimating how the user would drive the at least one of the one or more third vehicles. The computing device may determine, based on the one or more third performance metrics, whether to provide the user access to the third vehicle. Determining whether to provide the user access to the third vehicle may comprise transmitting, to a second computing device associated with a second user that owns the third vehicle, a summary of the one or more third performance metrics; and receiving, from the second computing device, an indication of whether to provide the user access to the third vehicle. The computing device may cause display, based on the behavioral difference, of one or more recommendations for improving a driving skill of the user.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction, aspects described herein are directed towards tracking and predicting driver behavior across a variety of different automobiles. It can be very difficult to predict how a driver will behave in a new automobile, and particularly in a new type of vehicle. For example, a driver that is determined to be a very safe driver in a subcompact vehicle or a minivan may drive in a much more reckless or less safe manner when driving in a high horsepower sports car. This can introduce significant concern in the vehicle rental context, where renters may seek out particularly unique vehicles available using those services (e.g., vintage automobiles, rare sports cars, larger trucks, outdoor adventure-ready vehicles, motorcycles) which require special handling and/or driving skills. The insurance status of the potential renter, including whether or not they have a history of traffic tickets or the like, is a poor indication of how a driver might handle such vehicles, as often that information is premised on the driver using a familiar (e.g., personal) vehicle. In contrast, by using telematics data to track performance metrics of a user driving a variety of vehicles, a more robust and comprehensive view of the driving tendencies of a user across a variety of vehicles may be determined. In other words, by tracking user performance across different vehicles (e.g., two different vehicles of the same type and/or different types of vehicles, like a truck and a minivan, or a personal car versus a rented car), changes in driver behavior may be predicted with respect to a new and unfamiliar vehicle. Predictions of future driver behavior based on this tracking may be of particular value when determining whether to provide a user access to a new type of vehicle, such as when determining whether to allow a user to rent a new type of vehicle. For example, based on a prediction that a user has a tendency to mishandle rented cars, as determined based on telematics data derived from that user's driving of personal and rented cars, a user might be prevented from renting a high powered sports car. Additionally and/or alternatively, as described below, those predictions may be used to provide a driver tips on improving his or her driving.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting, coupling, and the like.

Figure 1:
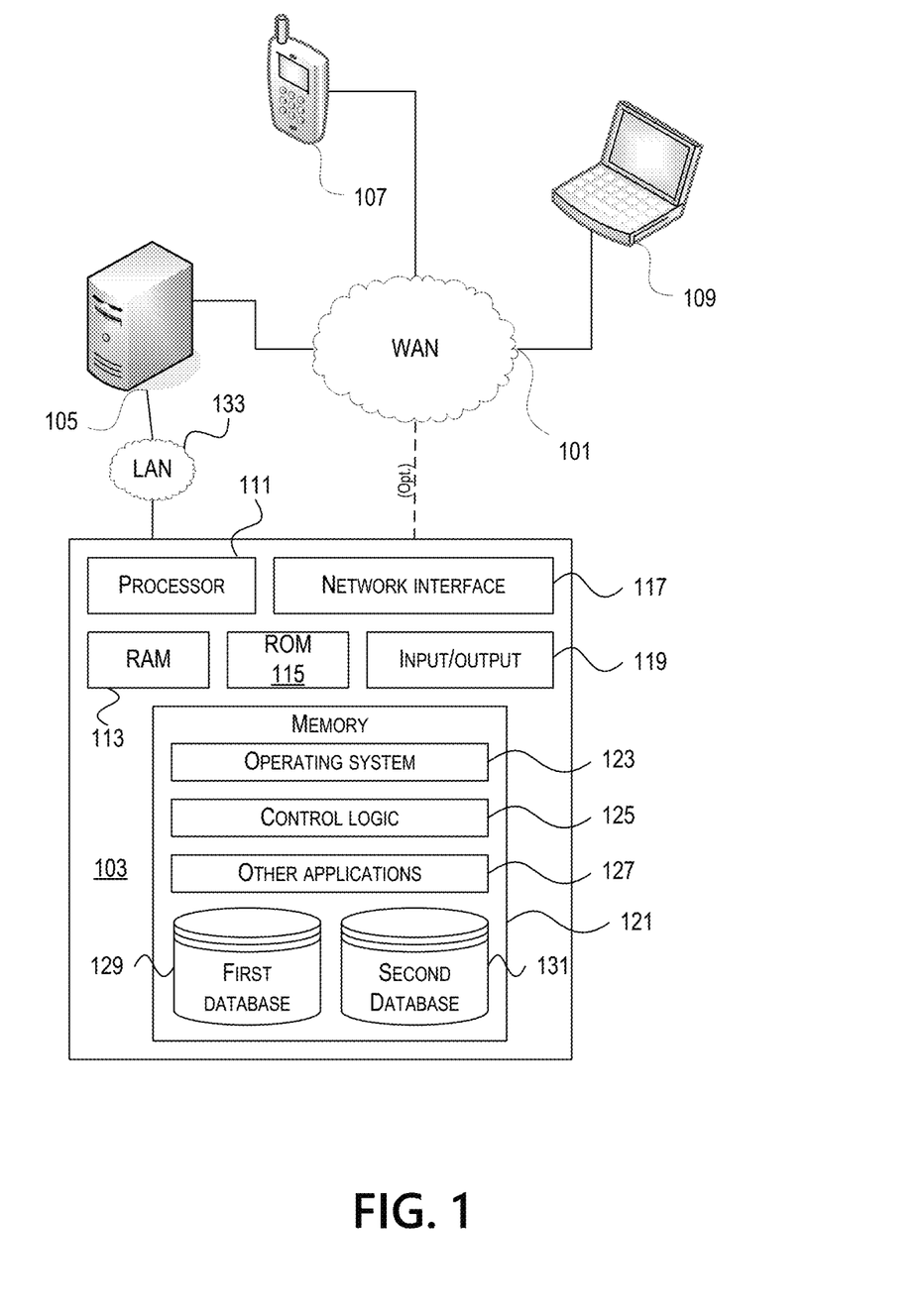
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 (which may additionally and/or alternatively be referred to as computing devices) may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 may provide overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of computer, server, or data processing device configured to perform the functions described herein. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
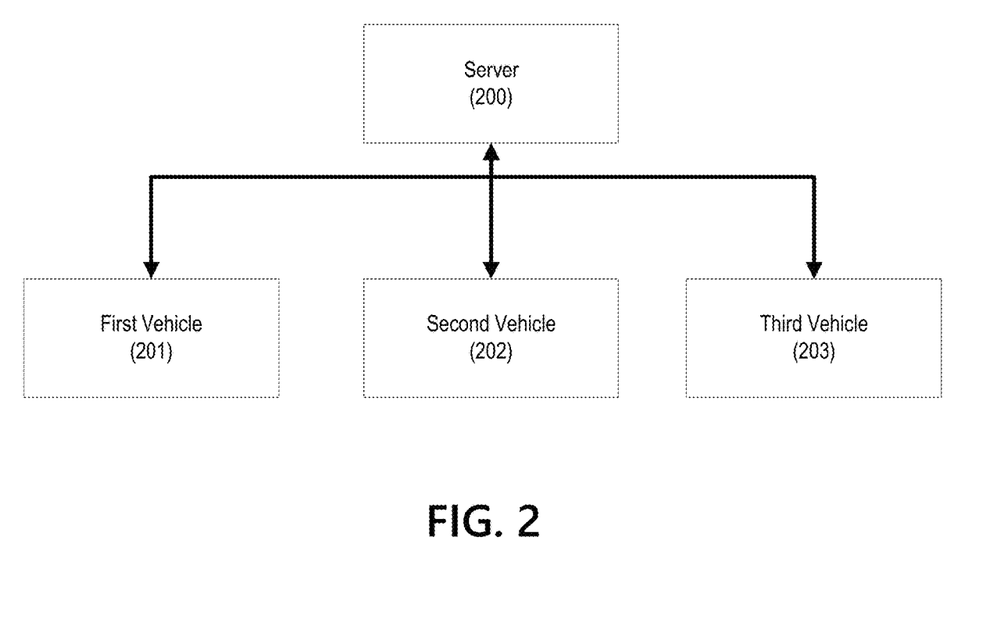
FIG. 2 depicts an environment including example vehicles communicatively coupled to a server in accordance with one or more aspects described herein.

FIG. 2 illustrates one example computing environment including a plurality of vehicles in accordance with one or more aspects described herein. FIG. 2 includes a first vehicle 201, a second vehicle 202, and a third vehicle 203 communicatively coupled to a server 200. The first vehicle 201, the second vehicle 202, and the third vehicle 203 may be communicatively coupled to the server 200 using one or more networks, including wired and wireless networks. For example, the first vehicle 201 may periodically (e.g., every ten minutes, every hour) transmit data to the server 200 over a wireless network. One or more intermediary devices may be used to transmit data from the vehicles depicted in FIG. 2 and the server 200. For example, a smartphone (e.g., of a driver of the first vehicle 201) may be used to transmit data associated with operation of the first vehicle 201 to the server 200.

The server 200 may be one or more computing devices, including any of the computing devices and/or servers discussed with respect to FIG. 1. As will be detailed further below, the server 200 may be configured to collect information (e.g., sensor data) relating to the performance of one or more of the first vehicle 201, the second vehicle 202, and/or the third vehicle 203, provide scores to one or more of the first vehicle 201, the second vehicle 202, and/or the third vehicle 203, predict driving performance associated with one or more of the first vehicle 201, second vehicle 202 and third vehicle 203, and the like.

The first vehicle 201, the second vehicle 202, and/or the third vehicle 203 may correspond to different automobiles that may be driven by a user. The vehicles need not be the same make, model, body style, or the like. For example, the first vehicle 201 may be a motorcycle, the second vehicle 202 may be a large truck, and the third vehicle 203 may be a go kart. Each of the first vehicle 201, the second vehicle 202, and/or the third vehicle 203 may be configured with one or more sensors, systems, and/or devices (e.g., those detailed in FIG. 3, as discussed below) which may capture data associated with the vehicle. Although three vehicles are shown in FIG. 2, more or fewer vehicles may be used without departing from the invention. Further, as will be discussed more fully herein, in some examples, the first vehicle 201 and second vehicle 202 may be vehicles previously driven by a user, while third vehicle 203 may be a vehicle the user is requesting to drive (e.g., via rental car company, peer-to-peer rental, or the like).

Figure 3:
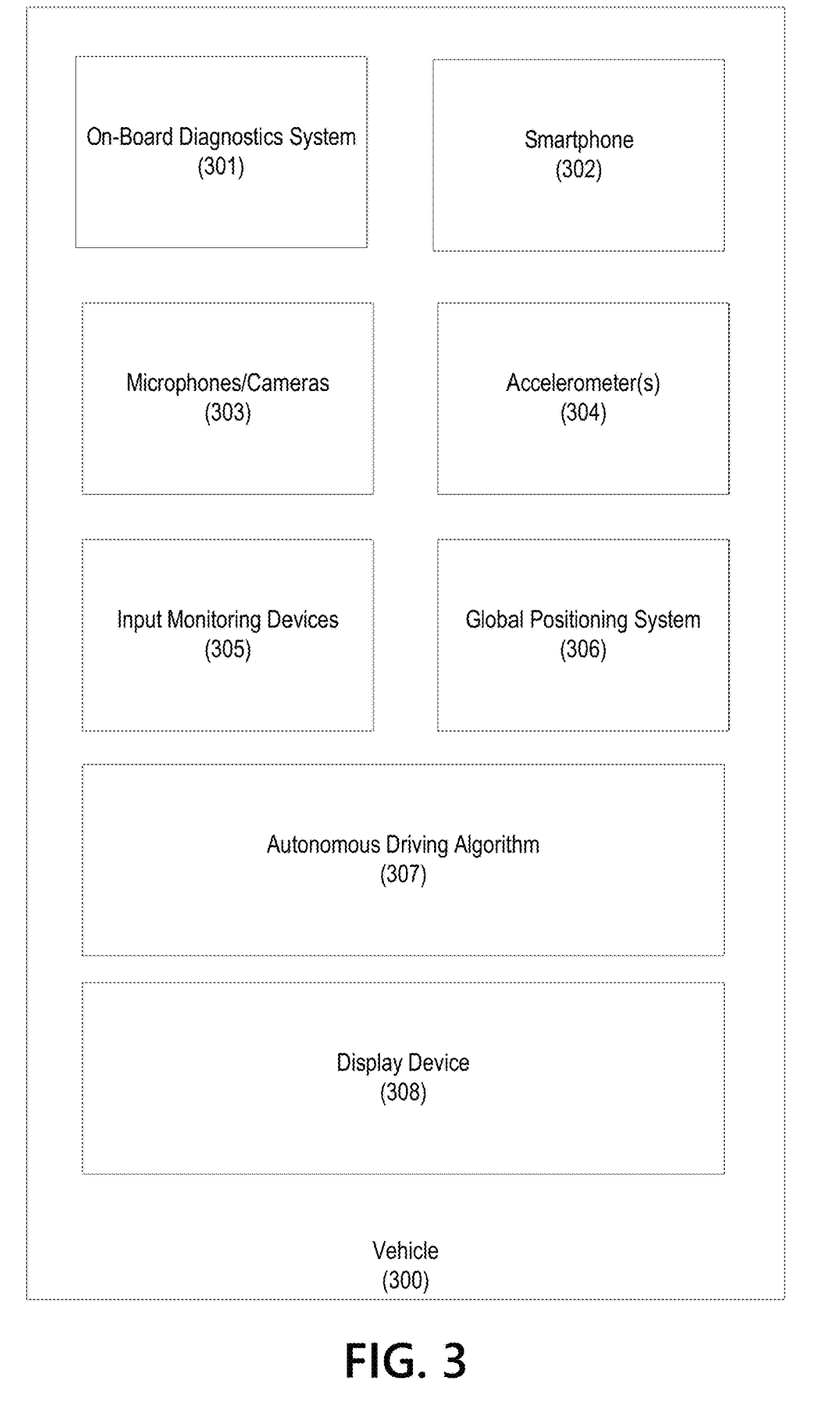
FIG. 3 is a schematic representation of an example vehicle including one or more example sensors, systems and devices which may be located in the vehicle in accordance with one or more aspects described herein.

FIG. 3 depicts schematic representation of an example vehicle 300 with various sensors, systems, and devices 301-306, including an on-board diagnostics system 301, a smartphone 302, microphones/cameras 303, accelerometer(s) 304, input monitoring devices 305, and global positioning system 306. Vehicle 300 may be the same or similar to any of vehicles 201, 202, 203 shown in FIG. 2 and one or more of vehicles 201, 202, 203 may include one or more sensors, systems, devices 301-306, or other components, described with respect to vehicle 300 in FIG. 3. The vehicle 300, is also shown with an autonomous driving algorithm 307 and a display device 308. The particular sensors, systems, and devices 301-306 shown in the vehicle 300 are illustrative, and any combination of sensors may be implemented. For example, the accelerometer(s) 304 may be replaced with any type of sensing device which detects the motion of the vehicle 300. As another example, the microphones/cameras 303 may be omitted. All or portions of the sensors, systems and devices 301-306 may be all or portions of the network nodes 103, 105, 107, and 109. Additionally and/or alternatively, all or portions of the sensors, systems, and devices 301-306 may be communicatively coupled to any of the computing devices and/or servers discussed with respect to FIG. 1. For example, the smartphone 302 may be communicatively coupled to the microphones/cameras 303 and/or may comprise the microphones/cameras 303.

The on-board diagnostics system 301 may be one or more systems used to monitor operations of the vehicle 300. The on-board diagnostics system 301 may monitor, for example, tire pressure, fuel levels, oil levels and/or health, electrical system performance, powertrain data, emissions-related data, vehicle identification data, vehicle speed, seat belt usage, headlight usage, windshield wiper usage, or the like. The on-board diagnostics system 301 may thus pertain to virtually any aspect of the operation of the vehicle 300. Data may be retrieved from the on-board diagnostics system 301 via an interface, such as an OBDII port.

The smartphone 302 may be associated with an individual, such as a driver of the vehicle 300. The smartphone 302 may comprise one or more motion sensors, such as an accelerometer, which may be used to monitor operation of the vehicle 300. For example, the smartphone 302 may be configured to record acceleration of the vehicle 300 while the smartphone 302 is located inside the vehicle 300. The smartphone 302 may advantageously allow for the collection of data from the vehicle 300 in circumstances where the vehicle 300 is not otherwise equipped to collect such data. For example, if the vehicle 300 is a motorcycle, the smartphone 302 may use all of its sensors (including, for example, the microphones/cameras 303, the accelerometer(s) 304, or the like) to collect data such as vehicle performance and operational data.

The microphones/cameras 303 may be used to collect video and/or audio information associated with operation of the vehicle 300. For example, the microphones/cameras 303 may be configured to record audio (e.g., with permission of one or more users or participants) outside of or inside the vehicle, whether as part of a telephone call by a driver and/or to detect events (e.g., crashes) which may implicate the safety of the vehicle 300. Similarly, the microphones/cameras 303 may be configured to record video or still images outside of or inside the vehicle to, for example, track the location of other vehicles outside of the vehicle 300, determine the number of passengers inside the vehicle 300, or the like. For example, the microphones/cameras 303 may be able to track how close the vehicle 300 is to other vehicles on the road.

The accelerometer(s) 304 may be used to determine the acceleration and/or other movement of the vehicle 300. For example, the accelerometer(s) 304 may be configured to determine when the vehicle 300 is accelerated abruptly, brakes hard, turns sharply, or the like. The accelerometer(s) 304 may be configured to measure both a direction and intensity of acceleration, such that the accelerometer(s) 304 may be configured to determine the intensity with which the vehicle 300 accelerates or decelerates in a particular direction.

The input monitoring devices 305 may be configured to monitor user input with respect to the vehicle 300. Such user input may comprise, for example, turning the steering wheel, using any pedals (including a clutch pedal), use of vehicle entertainment systems, or the like. The input monitoring devices 305 may thereby be configured to determine whether a user is driving the vehicle 300, is present in the vehicle 300, or the like. For example, if the vehicle 300 is in motion and the steering wheel of the vehicle 300 is not moving, this may indicate operation of the autonomous driving algorithm 307. The input monitoring devices 305 may communicate such information via the on-board diagnostics system 301.

The global positioning system 306 may be comprised to determine a location of the vehicle. Additionally and/or alternatively, the global positioning system 306 (or other sensors, such as the on-board diagnostics 301) may be configured to determine current lighting and/or weather conditions. The global positioning system 306 may be used to determine, for example, whether the vehicle 300 is on a highway, a back road, or the like. As discussed below, such information may be useful in that it indicates circumstances in which the autonomous driving algorithm 307 is operating.

The autonomous driving algorithm 307 may be any application, system, and/or combination of systems which may operate to perform one or more driving tasks associated with the vehicle 300. The autonomous driving algorithm 307 may, for example, operate to keep the vehicle 300 in its lane during driving, keep the vehicle 300 from hitting the back of other vehicles in front of the vehicle 300, and/or prevent a driver of the vehicle from steering into another vehicle located in a blind spot of the vehicle 300. The autonomous driving algorithm 307 may have multiple routines and/or subroutines. For example, the autonomous driving algorithm 307 may assist in two different driving tasks (e.g., accelerating and braking as part of a cruise control algorithm).

Autonomous driving algorithms, such as the autonomous driving algorithm 307, may be categorized into one of six different levels defined by the Society of Automotive Engineers. Level 0 driving may correspond to no autonomous driving whatsoever, though some systems may exist to aid the driver during the driving task. Level 1 may correspond to a single automated system for driver assistance, such as steering and/or accelerating (such as in the case of cruise control). Level 2 may correspond to partial automation, such as where the vehicle may perform some tasks as monitored by a driver. Level 3 may correspond to conditional automation, where the autonomous driving algorithm 307 may handle most tasks until taken over by a user. Level 4 may correspond to high automation, where the vehicle performs all driving tasks under certain circumstances (e.g., in a specific location as determined by the global positioning system 306), but driver override is still available. Level 5 may correspond to full automation, where no human involvement is involved. Autonomous driving algorithms, such as the autonomous driving algorithm 307, may be marketed as being one or more of these levels in different circumstances. That said, the marketing of these algorithms does not necessarily guarantee that the autonomous driving algorithm 307 is capable of performing these tasks as expected in all circumstances. For example, it is very possible that an autonomous driving algorithm, such as the autonomous driving algorithm 307, may be marketed as a Level 5 algorithm but may not perform Level 5 driving in all circumstances at desired level of safety.

The display device 308 may be configured to display content to a driver and/or other passengers of the vehicle 300. For example, the display device 308 may display a map based on information from the global positioning system 306. The display device 308 may also be configured to display information associated with the autonomous driving algorithm 307, such as an operational status of the autonomous driving algorithm 307. Additionally and/or alternatively, the display device 308 may be configured to display messages received from one or more computing devices. For example, the display device 308 may be configured to display a message indicating that a new version of the autonomous driving algorithm 307 is available to download and install.

Figure 4:
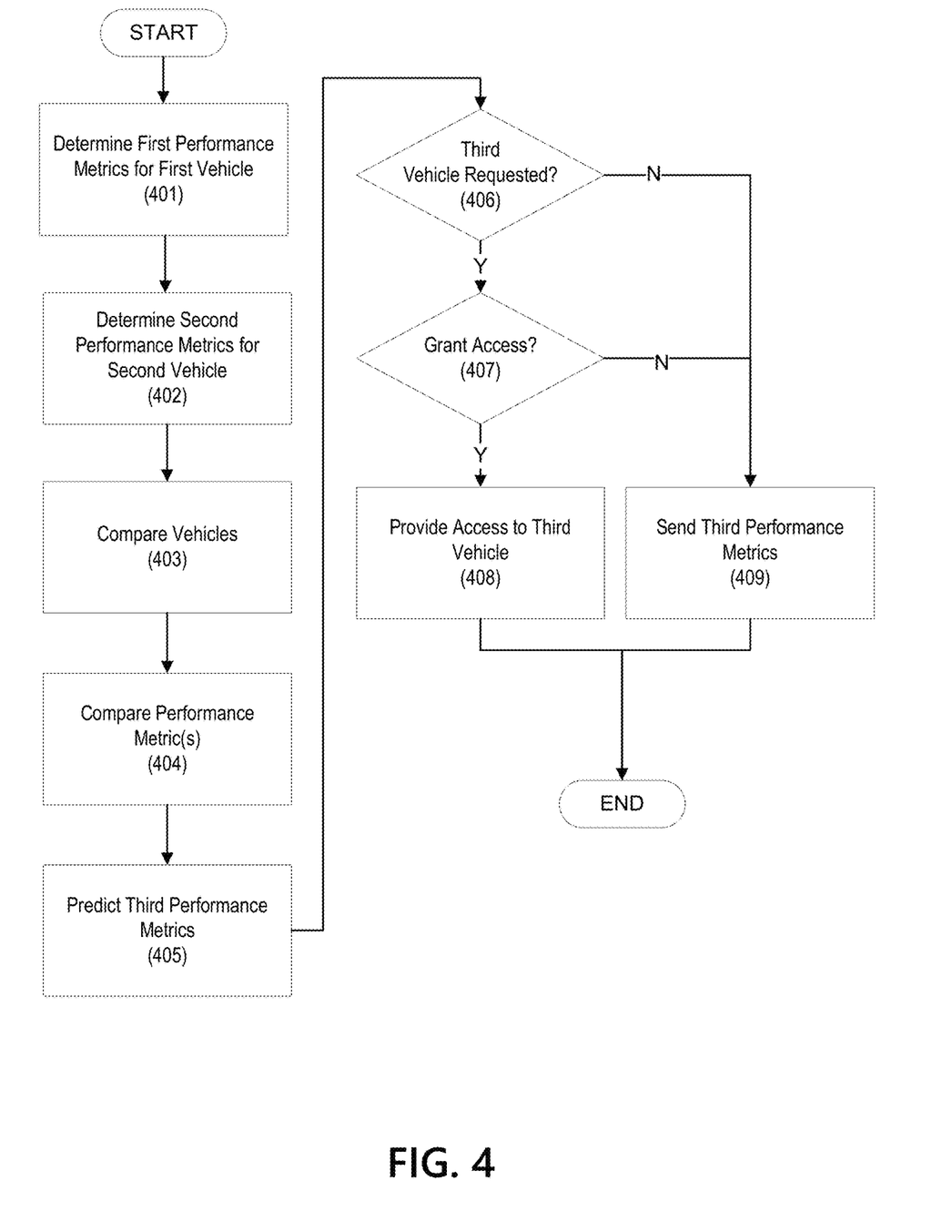
FIG. 4 depicts a flow chart illustrating a process to track the performance of a user across a plurality of automobiles in accordance with one or more aspects described herein.

FIG. 4 is a flow chart depicting an example process which may be performed by a computing device to track driver behavior in automobiles and predict driver behavior in automobiles, in accordance with one or more aspects described herein. The steps shown in FIG. 4 are illustrative, and may be rearranged, delayed, and/or omitted as desired. For example, determining the second performance metrics in step 402 may occur after comparing the vehicles in step 403. The steps shown in FIG. 4 may be performed by a computing device, such as any of the devices shown in FIG. 1, the server 200 of FIG. 2, and/or any other computing device configured to perform the functions described herein, such as an on-board computing device and/or a computing device having one or more processors and memory storing instructions that, when executed by the one or more processors, cause the computing device to perform the steps shown in FIG. 4.

In step 401, first performance metrics may be determined for a first vehicle, such as vehicle 201 shown in FIG. 2, and in step 402, second performance metrics may be determined for a second vehicle, such as vehicle 202 in FIG. 2. In both cases, sensors, systems, and devices, such as those depicted in FIG. 3, may be used to track a performance of a user driving one or more vehicles. For example, the first performance metrics may indicate a performance of a truck when driven by a user, and the second performance metrics may indicate a performance of a sports car when driven by the user. Though only two sets of performance metrics are described with respect to steps 401 and 402, any quantity of performance metrics may be determined for any number of different automobiles. For example, there may be fifty different performance metrics, each corresponding to a different vehicle that has been driven by a user.

Performance metrics may be any subjective or objective measurement of the performance of a vehicle, such as any one or more of the vehicles 201, 202, 203, 300, when being driven by a user. Such performance metrics may be derived from telematics data received from the sensors, systems and devices referenced in FIG. 3. For example, a performance metric may correspond to whether or not a driver or autonomous driving algorithm is prone to hard braking (e.g., number of hard braking occurrences in a predetermined time period), sudden acceleration (e.g., acceleration over a predetermined distance), hard turns, swerving, wheel slippage, revving an engine of the vehicle 300 (and/or any one of the vehicles depicted in FIG. 2) close to its redline, or the like. As another example, a performance metric may correspond to an average speed, acceleration, distance traveled, or other similar information about the objective performance of a vehicle such as the vehicle 300 (and/or any one of the vehicles depicted in FIG. 2). Such information may be derived from telematics data received from any of the sensors, systems and/or devices discussed with respect to FIG. 3, including a combination thereof. The performance metrics may thereby provide detail as to the overall objective and/or subjective performance of a driver and/or autonomous driving algorithm.

In step 403, the vehicles used to determine the first performance metrics in step 401 (e.g., vehicle 201) and the second performance metrics in step 402 (e.g., vehicle 202) may be compared to determine one or more vehicle differences. A vehicle difference may pertain to the type of the vehicles (e.g., car versus truck), properties of the vehicles (e.g., horsepower, size, weight, cost, age), or any other differences between two different vehicles. For example, one vehicle may be an older subcompact automobile, whereas another vehicle may be a newer diesel truck. As another example, two vehicles may both be the same make, model, and year, but may be of a different color and/or may have a different mileage.

The differences determined in step 403 may pertain to how a driver may differently handle the vehicle. For example, an older truck may be more difficult to drive than a newer subcompact car. As another example, a heavier, higher horsepower vehicle may be harder to handle as compared to a lighter, lower horsepower vehicle. As yet another example, a driver may drive a brightly-colored car slightly more recklessly than a dark-colored car.

The vehicle differences determined in step 403 may comprise determining differences in autonomous driving algorithms provided by the vehicles. A vehicle, such as the vehicle 300 and/or any one of the vehicles depicted in FIG. 2, may execute one or more autonomous driving algorithms, such as the autonomous driving algorithm 307. Vehicles may be different in that they provide different levels of autonomous driving which may influence how well a driver may be able to drive. For example, an autonomous driving algorithm which provides nearly hands-free driving will result in better driving performance, regardless of driver skill, as compared to a relatively less robust autonomous driving algorithm. As such, vehicle differences pertaining to autonomous driving algorithm may be used to weight, ignore, or otherwise modify consideration of performance metrics collected during operation of vehicles.

In step 404, the performance metrics (such as the first performance metrics determined in step 401 and the second performance metrics determined in step 402) may be compared. Comparing the performance metrics may comprise determining a behavioral difference of a user when driving different vehicles, such as the first vehicle and the second vehicle. Comparing the performance metrics may additionally and/or alternatively comprise determining qualitative and/or quantitative differences between the performance metrics. A qualitative difference may comprise, for example, a determination that a user more gently brakes in one automobile (e.g., a luxury sedan) as compared to another (e.g., a sports car). A quantitative difference may comprise, for example, a determination that a driver is prone to driving a first type of vehicle (e.g., sports sedans) faster on average than a second type of vehicle (e.g., minivans).

The behavioral difference determined by comparing the performance metrics in step 404 may determine a difference in the way a driver uses different vehicles and/or types of vehicles. For example, the driver may commonly drive a first vehicle (and/or first type of vehicle) with a different quantity of passengers (e.g., a different average quantity of passengers) as compared to a second vehicle (and/or a second type of vehicle).

Comparing the performance metrics may comprise using a machine learning algorithm to evaluate and/or compare the performance metrics. A machine learning model may be trained using various performance metrics (e.g., performance metrics tagged as indicating safe driving and performance metrics tagged as indicating unsafe driving), such that the machine learning model may be configured to evaluate whether all or portions of performance metrics correspond to safe and/or unsafe driving. Such information may be used to compare performance metrics. For example, a machine learning model may indicate that first performance metrics (e.g., example performance metrics) correspond to safe driving, and second performance metrics correspond to unsafe driving, such that the same driver drives a first vehicle more safely than a second vehicle. The machine learning model may thereby be trained, based on training sets of performance data, whether new performance data indicates safe or unsafe driving, proficient or unskilled driving, or the like.

The behavioral difference may comprise a determination that a driver drives a first vehicle (and/or first type of vehicle) in a more distracted and/or more reckless manner as compared to a second vehicle (and/or second type of vehicle). Performance metrics may suggest distracted driving through one or more instances of a driver not paying attention to a driving task, whereas performance metrics may suggest reckless driving through one or more instances of a driver operating in a vehicle that increases the likelihood of danger, such as a wreck. Determining that a driver drives a vehicle in a distracted manner may comprise determining, for example, that the driver's eyes are more likely to look at a smartphone (e.g., as determined by a camera, such as one of the microphones/cameras 303), the driver is more likely to talk on the phone and/or with a certain kind of passenger (e.g., as determined by one or more of the microphones/cameras 303 and/or via the smartphone 302), is less likely to keep control of a steering wheel (e.g., as determined using the input monitoring devices 305), or the like. Determining that a driver drives a vehicle in a reckless manner may comprise, for example, determining that the vehicle regularly drives over a speed limit (e.g., as determined using the on-board diagnostics system 301 and/or the global positioning system 306), gets excessively close to nearby cars or objects (e.g., as determined via a camera of the microphones/cameras 303), turns so sharply as to drift on the road (e.g., as determined by the accelerometer(s) 304), or the like.

The behavioral difference may comprise a pattern of behavior, such as behaviors over time. For example, a user may always exceed the speed limit when on a highway at night, but not during the daytime. Such a behavioral pattern may relate to times of day (e.g., daytime, nighttime, after work, etc.), locations (e.g., a highway, back roads), a number of passengers (e.g., such that a driver may have a propensity to go slower when children are in the car), or the like.

In step 405, based on comparing the performance metrics in step 404 and/or the vehicle differences, third performance metrics which predict how a driver would drive a third vehicle may be determined. The third performance metrics may be determined with respect to the same driver as with respect to steps 401 and 402 but with respect to one or more vehicles different from the vehicles in steps 401 and 402. As such, the third performance metrics may predict, based on how the driver drove the first vehicle and the second vehicle, how the driver would drive a third vehicle, whether or not the driver has driven the third vehicle before.

Determining the third performance metrics may comprise predicting how behavior of a driver with respect to the first vehicle and/or second vehicle would apply to the third vehicle. For example, if the first performance metrics and/or second performance metrics suggest that the driver is prone to driving rental vehicles recklessly (as determined using the factors discussed above, such as the driver driving rental vehicles over the speed limit), then, if the third vehicle is a rental vehicle, the third performance metrics may indicate predicted reckless driving. As another example, if the first performance metrics correspond to a subcompact car and the second performance metrics correspond to a large truck, and if the second performance metrics are considerably worse than the first performance metrics, it may be derived that the driver does not have the adequate driving skills to handle large trucks, such as a third vehicle that is a large truck.

In this manner, the third performance metrics may comprise a prediction of future driving activity by the driver. Such predictions may be based on, among other considerations, the predicted time, location, and use of the third vehicle (e.g., vehicle 203 in FIG. 2). For example, the third performance metrics may be different based on whether the third vehicle is predicted to be used in poor weather conditions, at night, or the like.

In step 406, it is determined whether one or more third vehicles have been requested by the driver. The one or more third vehicles may correspond to the third performance metrics determined in step 405. Such a request may comprise, for example, a request to rent the one or more third vehicles. Additionally and/or alternatively, such a request may be to purchase the one or more third vehicles, to add the one or more third vehicles to an insurance policy, or the like. If the one or more third vehicles have been requested, the flow chart proceeds to step 407. Otherwise, the flow chart proceeds to step 409.

In step 407, it is determined whether to provide the driver access to the one or more third vehicles. Providing access to the one or more third vehicles may depend on all or portions of the third performance metrics satisfying a threshold. For example, if the third performance metrics do not satisfy a safety threshold, the driver may be refused access to the automobile. If access is provided, the flow chart may proceed to step 408. Otherwise, the flow chart proceeds to step 409.

In step 408, access to the one or more third vehicles may be provided to the driver. Providing access may comprise, for example, transmitting an indication to an individual (e.g., the owner of the one or more third vehicles) that access should be granted. Providing access may additionally and/or alternatively comprise remotely unlocking the one or more third vehicles, adding the one or more vehicles to an insurance policy, or the like. As such, the requested vehicle referenced in step 406 need not be a vehicle that the driver plans to drive soon, but might, for example, be a vehicle that the requesting driver plans to purchase and/or rent in the future.

Providing access to the driver in step 408 may comprise receiving additional approvals to provide the one or more third vehicles to the user. For example, indications of the one or more third performance metrics may be transmitted to an owner of the one or more third vehicles, and, in response, an indication of whether to provide the requesting user access to the one or more third vehicles may be received. Additionally and/or alternatively, approvals to provide access to the driver in step 408 may be received from one or more insurance companies, banks, or the like.

In step 409, if the one or more third vehicles are not requested as determined in step 406 and/or if access is not provided in step 407, then the one or more third performance metrics may be sent to, e.g., another computing device. Sending the one or more third performance metrics may comprise transmitting, to the driver, an indication of the one or more third performance metrics. The one or more third performance metrics may be displayed, e.g., on the display device 308 of the vehicle 300. For example, a driver may be provided tips for improving their driving performance, and/or may be told one or more reasons why they were refused access to the one or more third vehicles. Additionally and/or alternatively, as part of step 409, a summary of the one or more third vehicles may be transmitted to a second user that owns the one or more third vehicles.

Figure 5:
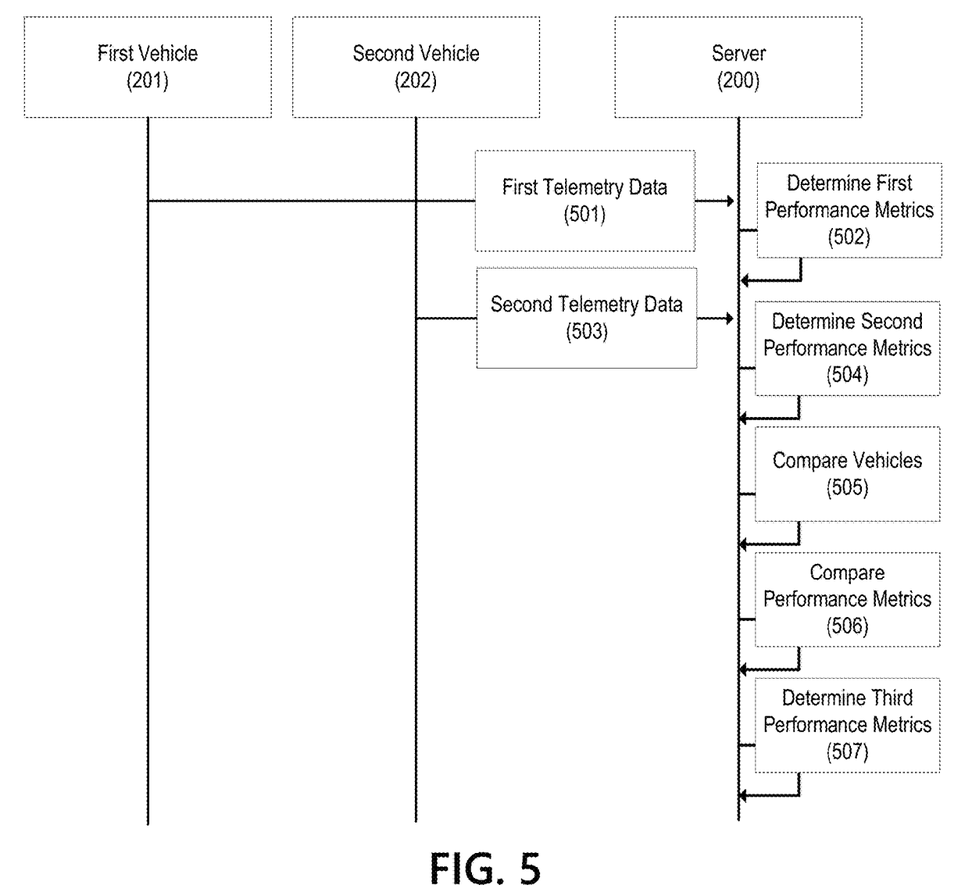
FIG. 5 shows an event sequence comprising steps which may be performed to predict driving performance of a user in accordance with one or more aspects described herein.

FIG. 5 shows an event sequence comprising steps which may be performed to predict performance metrics. FIG. 5 shows the first vehicle 201, the second vehicle 202, and the server 200. The first vehicle 201 and the second vehicle 202 may be the same or similar to the first vehicle and second vehicle as referenced with respect to step 401 and step 402 of FIG. 4. As discussed, each of first vehicle 201 and second vehicle 202 may include one or more components described with respect to vehicle 300 in FIG. 3. The server 200 may be any computing device, such as an on-board computing device, a smartphone (such as the smartphone 302), or the like. For example, the server 200 may be the same or a similar computing device as the computing device that performs the steps of FIG. 4.

In step 501, first telematics data may be sent from the first vehicle 201 (e.g., one or more sensors, devices or systems in or associated with first vehicle 201) to the server 200. The first telematics data may be generated by the first vehicle 201 using one or more devices, systems or sensors, such as the devices, systems and/or sensors described with respect to FIG. 3. In step 502, and based on the first telematics data, first performance metrics may be determined. This process may be the same or similar as described with respect to step 401 of FIG. 4.

In step 502, second telematics data may be sent from the second vehicle 202 to the server 200. The second telematics data may be generated by the second vehicle 202 (e.g., one or more sensors, systems or devices in or associated with the second vehicle) using one or more devices, systems, and/or sensors, such as the devices, systems, and/or sensors described with respect to FIG. 2. Then, in step 503, and based on the second telematics data, second performance metrics may be determined. This process may be the same or similar as described with respect to step 402 of FIG. 4.

In step 505, the server 200 may compare the vehicles (e.g., the first vehicle 201 and the second vehicle 202). This step may be the same or similar as described with respect to step 403 of FIG. 4.

In step 506, the server 200 may compare the performance metrics (e.g., the performance metrics determined in steps 502 and 504). This step may be the same or similar as described with respect to step 404 of FIG. 4.

In step 507, the server 200 may determine, based on the comparisons (e.g., the comparison in step 505 and/or the comparison in step 506), third performance metrics for a third vehicle 203. The third performance metrics may be predicted using, for example, a machine learning model. The machine learning model may be trained using, for instance, sets of performance metrics such that the machine learning model may be trained to predict performance metrics corresponding to a third vehicle based on performance metrics corresponding to a first vehicle and a second vehicle. Step 507 may involve the same or similar processes as described with respect to step 405 of FIG. 4.

Figure 6:
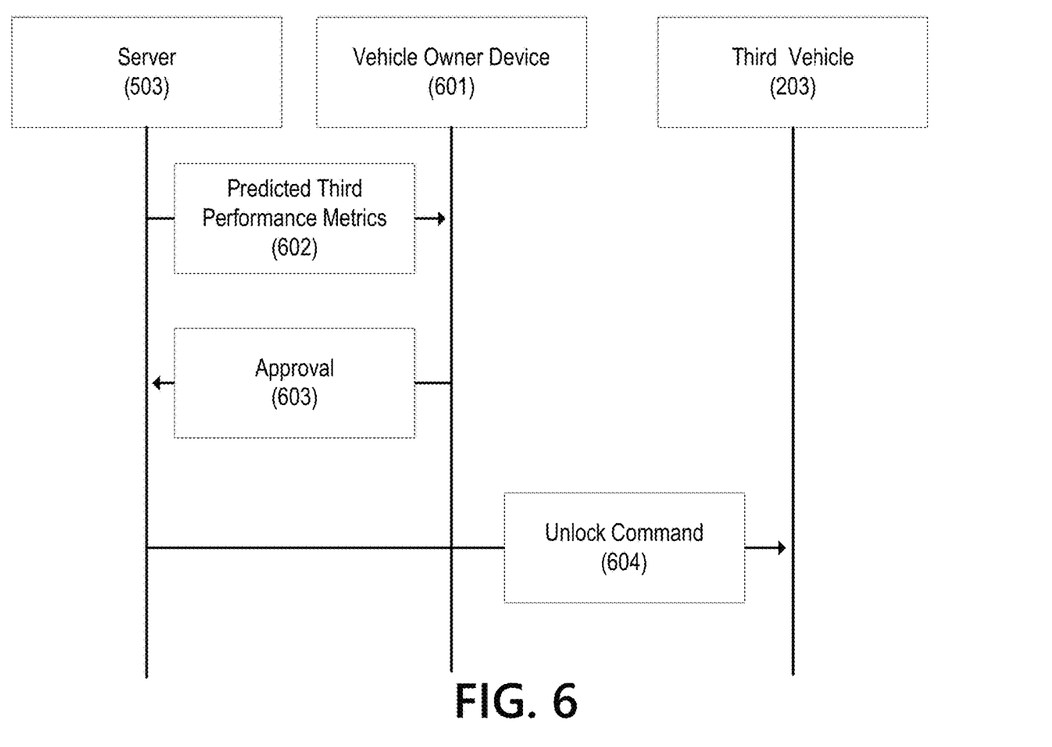
FIG. 6 shows an event sequence comprising steps for providing access to a vehicle based on predicted performance metrics in accordance with one or more aspects described herein.

FIG. 6 shows an event sequence comprising steps which may be performed for providing access, based on predicted third performance metrics, to the third vehicle 203, which may additionally and/or alternatively be referred to as a requested vehicle. FIG. 6 may comprise a continuation of FIG. 5, such that the steps shown in FIG. 6 may follow step 506 of FIG. 5. In FIG. 6, the server 200 may be the same or similar as compared to FIGS. 2 and 5. FIG. 6 also introduces a vehicle owner device 601. The vehicle owner device 601 may comprise, for example, a smartphone or other similar computing device, such as those described with respect to FIG. 1. The third vehicle 203 may include the same or similar components as the vehicle 300 of FIG. 3

In step 602, the server 200 may transmit the predicted third performance metrics (e.g., the third performance metrics predicted in step 506) to the vehicle owner device 601. This step may comprise transmitting an indication that the third vehicle 203 has been requested by a particular driver. For example, step 602 may comprise transmitting information about the driver associated with the third performance metrics, including the requesting driver's name and how the requesting driver is predicted to treat the third vehicle 203 when driving the third vehicle 203.

In step 603, the vehicle owner device 601 may transmit, to the server 200, an approval. The approval may indicate that the driver requesting access to the third vehicle 203 is permitted to access the requested vehicle 602. The approval need not be in any particular format, though the approval may be formatted and/or otherwise encrypted so as to ensure that the approval cannot be spoofed or otherwise faked by an unauthorized user.

In step 604, based on receiving the approval transmitted in step 603, the server 200 may transmit an unlock command to the third vehicle 203. The unlock command may cause one or more locks on the third vehicle 203 to unlock, thereby providing a requesting driver with access to the third vehicle 203. In this manner, a requesting driver might be provided access to a vehicle remotely, and based on the way in which that requesting driver is predicted to treat the third vehicle 203. Such an unlock command may be particularly advantageous for certain types of peer-to-peer car sharing services, as some cars may be equipped with devices which allow the owner to remotely monitor and loan the third vehicle 203.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   determining, by a computing device and using first sensors of a first vehicle, one or more first performance metrics indicating performance of the first vehicle when driven by a user;
   determining, by the computing device and using second sensors of a second vehicle, one or more second performance metrics indicating performance of the second vehicle when driven by the user;

comparing the first vehicle and the second vehicle to determine a vehicle difference between the first vehicle and the second vehicle;

comparing the one or more first performance metrics and the one or more second performance metrics to determine a behavioral difference of the user when driving the first vehicle as compared to the second vehicle;

determining, based on the behavioral difference, based on the vehicle difference, and using a machine learning model, one or more third performance metrics which predict performance of a third vehicle, different from the first vehicle and the second vehicle, when driven by the user, wherein the machine learning model is trained using a first set of example performance metrics corresponding to safe driving and a second set of performance metrics corresponding to unsafe driving; and based on determining, based on the one or more third performance metrics, whether to provide the user access to the third vehicle:

generating a notification indicating whether to provide the user access to the third vehicle, the notification configured to unlock the third vehicle or maintain a locked state of the third vehicle; and transmitting the notification.

2. The method of claim 1, wherein determining the vehicle difference between the first vehicle and the second vehicle comprises:

determining that the first vehicle and the second vehicle each are configured to provide different levels of autonomous driving.

3. The method of claim 1, wherein determining the behavioral difference comprises:

determining that the user drove the first vehicle with a different number of passengers as compared to the second vehicle.

4. The method of claim 1, wherein the first sensors comprise one or more first sensors of a smartphone associated with the user, and wherein the second sensors comprise the one or more first sensors of the smartphone.

5. The method of claim 1, wherein determining the behavioral difference comprises:

determining that the user drives the first vehicle at a higher speed as compared to the second vehicle.

6. The method of claim 1, wherein determining the behavioral difference comprises:

determining that the user uses a smartphone more often when driving the first vehicle as compared to the second vehicle.

7. The method of claim 1, wherein predicting the one or more third performance metrics comprises:

determining at least one of a plurality of vehicles that is similar to the first vehicle; and predicting, based on the one or more first performance metrics, the one or more third performance metrics by estimating how the user would drive the at least one of the plurality of vehicles.

8. The method of claim 1, wherein the third vehicle is a different type of vehicle as compared to the first vehicle and the second vehicle.

9. The method of claim 1, wherein determining whether to provide the user access to the third vehicle comprises:

transmitting, to a second computing device associated with a second user that owns the third vehicle, a summary of the one or more third performance metrics; and receiving, from the second computing device, an indication of whether to provide the user access to the third vehicle.

10. The method of claim 1, further comprising:

causing display, by the computing device and based on the behavioral difference, of one or more recommendations for improving a driving skill of the user.

11. A method comprising:

determining, by a computing device and using one or more sensors of a smartphone associated with a user, one or more first performance metrics indicating performance a first type of vehicle when driven by the user;

determining, by the computing device and using the one or more sensors of the smartphone associated with the user, one or more second performance metrics indicating performance of a second type of vehicle, different from the first type of vehicle, when driven by the user;

comparing the one or more first performance metrics and the one or more second performance metrics to determine a behavioral difference of the user when driving the first type of vehicle and the second type of vehicle;

determining, based on the behavioral difference and the vehicle difference, one or more third performance metrics which predict performance of a third type of vehicle, different from the first type of vehicle and the second type of vehicle, when driven by the user;

determining, based on the one or more third performance metrics, whether to provide the user access to a vehicle that corresponds to the third type of vehicle; and transmit a notification configured to unlock the third vehicle or maintain a locked state of the third vehicle based on the determining of whether to provide the user access.

12. The method of claim 11, wherein the second type of vehicle executes a different level of autonomous driving as compared to the first type of vehicle.

13. The method of claim 11, wherein the one or more first performance metrics indicate a first number of passengers in the first type of vehicle, and wherein the one or more second performance metrics indicate a second number of passengers in the second type of vehicle.

14. The method of claim 11, wherein determining the behavioral difference comprises:

determining that the user drives the first type of vehicle at a higher speed as compared to the second type of vehicle.

15. The method of claim 11, wherein determining the behavioral difference comprises:

determining that the user uses the smartphone more often when driving the first type of vehicle as compared to the second type of vehicle.

16. The method of claim 11, further comprising:

causing display, by the computing device and based on the behavioral difference, of one or more recommendations for improving a driving skill of the user.

17. The method of claim 11, wherein determining whether to provide the user access to the vehicle comprises:

transmitting, to a second computing device associated with a second user that owns the vehicle, a summary of the one or more third performance metrics; and receiving, from the second computing device, an indication of whether to provide the user access to the vehicle.

18. A method comprising:

determining, by a computing device, using first sensors of a first vehicle, and during a first trip taken by the first vehicle, one or more first performance metrics indicating performance of the first vehicle when driven by a user;

determining, by the computing device, using second sensors of a second vehicle, and during a second trip taken by the second vehicle, one or more second performance metrics indicating performance of the second vehicle when driven by the user;

comparing the first vehicle and the second vehicle to determine a vehicle difference between the first vehicle and the second vehicle;

comparing, based on the vehicle difference, the one or more first performance metrics and the one or more second performance metrics to determine a behavioral difference of the user when driving the first vehicle as compared to the second vehicle;

receiving, from the user, a request to access a third vehicle different from the first vehicle and the second vehicle;

determining, based on the behavioral difference, the vehicle difference, and the request, one or more third performance metrics which predict performance of the third vehicle when driven by the user; and providing, based on comparing the one or more third performance metrics to a safety threshold, the user access to the third vehicle, wherein providing the user access includes transmitting signaling to unlock the third vehicle or maintain a locked state of the third vehicle.

19. The method of claim 18, wherein determining the behavioral difference comprises:

determining that the user drives the first vehicle at a higher speed as compared to the second vehicle.

20. The method of claim 18, wherein determining the behavioral difference comprises:

determining that the user uses a smartphone more often when driving the first vehicle as compared to the second vehicle.

* * * * *